April 23, 1946.　　W. H. MATHEÉ, JR., ET AL　　2,399,130
MODEL AIRPLANE CONSTRUCTION
Filed June 30, 1944　　2 Sheets-Sheet 1
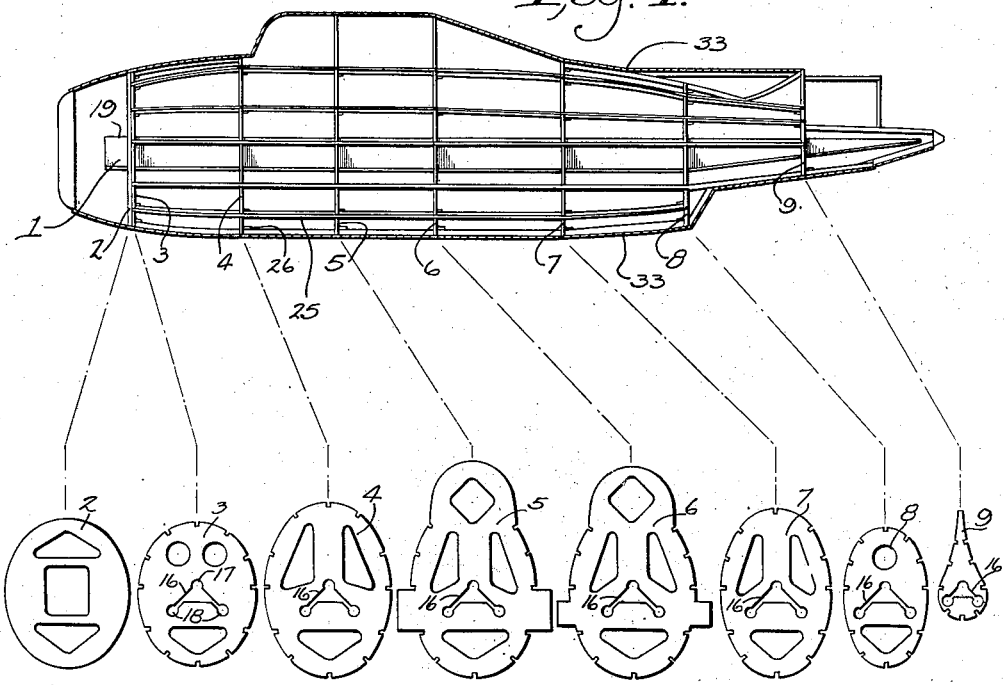
Fig. 1.
Fig. 2. Fig. 3. Fig. 4. Fig. 5. Fig. 6. Fig. 7. Fig. 8. Fig. 9.
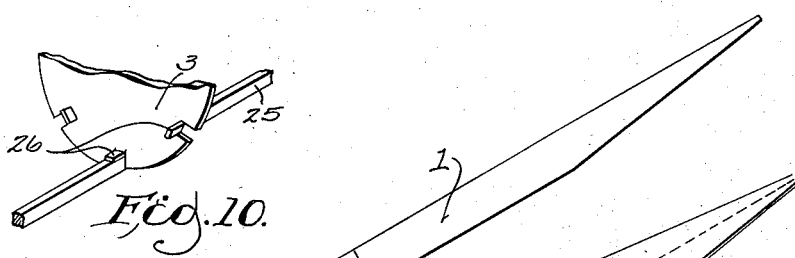
Fig. 10.
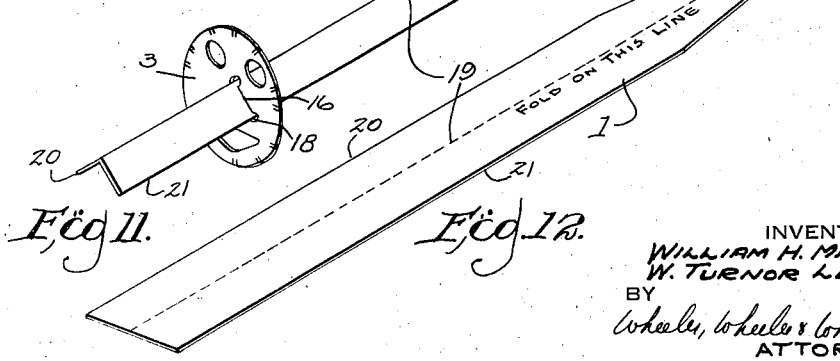
Fig. 11.　　Fig. 12.
INVENTORS
WILLIAM H. MATHEÉ JR.
W. TURNOR LEWIS.
BY
Wheeler, Wheeler & Wheeler
ATTORNEYS.

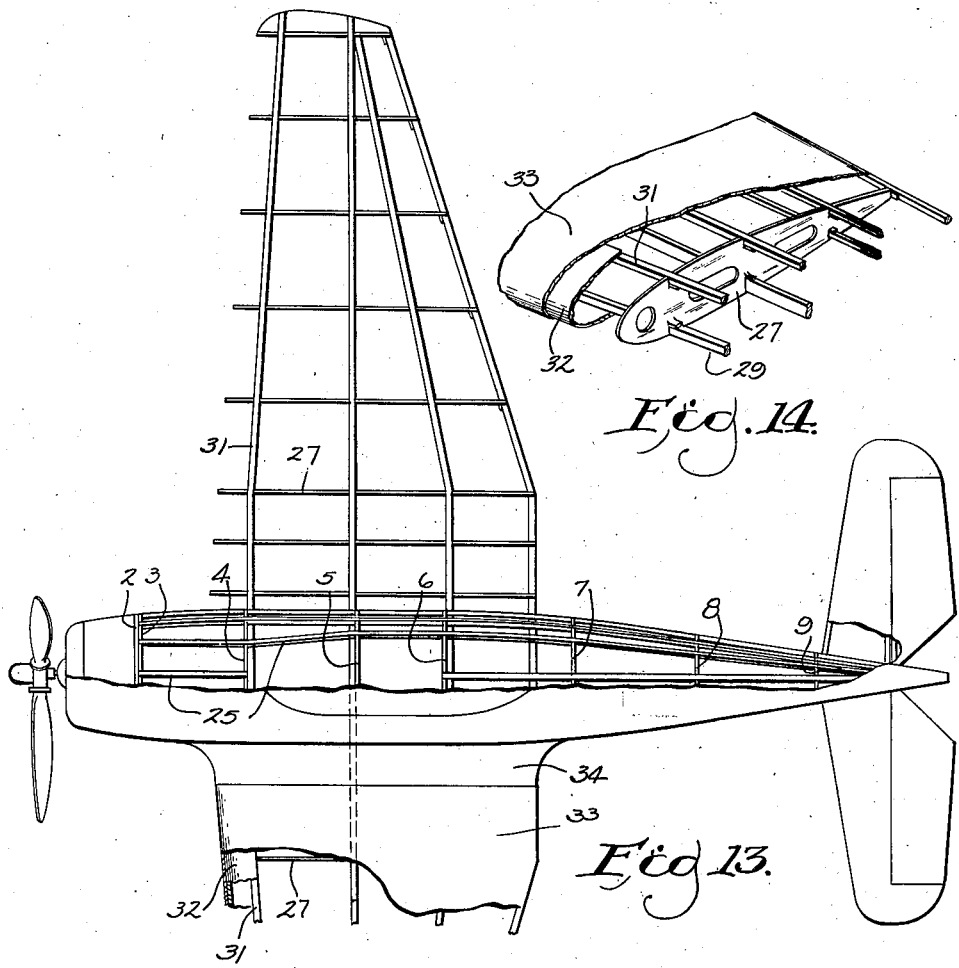
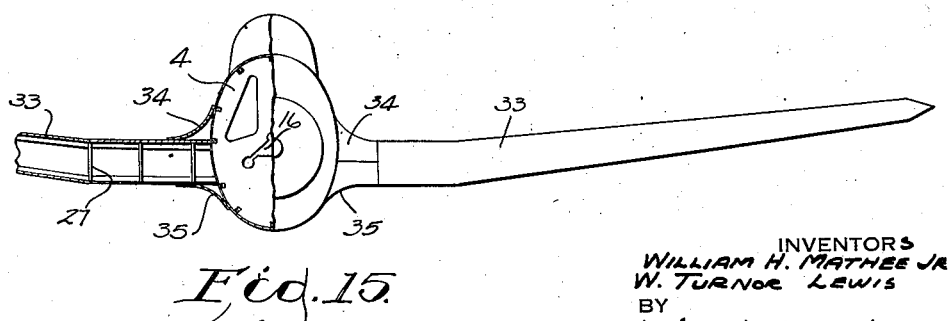

Patented Apr. 23, 1946

2,399,130

UNITED STATES PATENT OFFICE 2,399,130

MODEL AIRPLANE CONSTRUCTION

William H. Mathée, Jr., and William Turnor Lewis, Racine, Wis., assignors to Whitman Publishing Company, Racine, Wis., a corporation of Wisconsin Application June 30, 1944, Serial No. 542,966

11 Claims. (Cl. 46—76)

This invention relates to improvements in model airplane construction and has to do with structure, jigs, and methods.

It is a principal object of the invention to provide a novel and improved jig for use in assembling a model airplane, the jig being foldable whereby it may be shipped flat and adapted to cooperate with formers erected thereon and apertured to fit the folded jig, whereby the jig positions the formers while being held rigidly in assembly position by the formers themselves. The jig is adapted to be left in the model airplane as a permanent part thereof or may be readily removed, as desired.

Another object of the invention is to construct the formers for facilitating their interaction with the foldable jig and with the longérons or spars to be glued thereto, one purpose being to enhance the degree of adhesion between the longérons and the formers.

Another object of the invention is to provide an improved leading edge for the wing of a model airplane.

Other objects will appear from the following disclosure of the invention.

In the drawings:

Figure 1 is a side elevational view of an assembled fuselage embodying parts prepared and assembled in accordance with this invention.

Figures 2 to 9, inclusive, are front elevations of the component formers used in assembling the fuselage of Figure 1.

Figure 10 is a fragmentary detail view in perspective, showing one of the formers and a longéron or spar as they appear when assembled.

Figure 11 is a detail view in perspective showing one of the formers mounted on the assembly jig as a first step in assembling the fuselage shown in Figure 1.

Figure 12 is a plan view of a preferred type of jig in its flat condition, prior to being folded to the form shown in Figure 11.

Figure 13 is a plan view of the assembled plane, a portion of the skin being broken away to expose the framework.

Figure 14 is a fragmentary view in perspective showing one of the wings with a portion of its cover removed.

Figure 15 is a fragmentary front elevation of the assembled model plane shown in Figure 13, portions of the skin being removed.

Like parts are identified by the same reference characters throughout the several views.

Model airplane parts are frequently partially cut, to be pressed by the user from a sheet of wood or board stock. One of the purposes of the present invention is to provide a jig which may be supplied to the user in the same manner, if desired, or may, at least, be shipped flat in the same package and bent or folded by the user to provide a support for aligning formers such, for example, as fuselage section members to be erected or assembled thereon.

Such a jig is shown at 1. It is illustrated in its flat initial form in Figure 12. The component or former parts to be mounted on the jig are separately shown at 2, 3, 4, 5, 6, 7, 8 and 9 in the views of corresponding number. The formers No. 3 to 9, inclusive, have slots 16 adapted to fit the jig, each slot having a circular enlargement 17 at its apex and similar enlargements 18 at the divergent ends of the leg portions of the slots. A portion of the board from which the former is cut may be removed within the divergent legs of the slot if desired. Other apertures of suitable shape may be made in each former to reduce its weight.

In making the preferred V-jig as illustrated the user takes the flat jig blank and folds it on its longitudinal center line 19 so that the jig has the form of a V in cross section, as indicated in Figure 11. The angle between the legs of the jig is adjusted to conform to the angularly related portions of the V-shaped slot in one of the former, as, for example, the former 3. Ordinarily the jig will tend to expand slightly. The jig is thereupon inserted in the slot 16 of the selected former where the circularly enlarged portions 17, 18, of the slot accommodate any inaccuracies along the folded margin 19 or the free margins 20, 21 of the jig. The former resists tendency of the jig to expand or contract and determines its shape.

Thus, without undue binding, or any tendency to tear the former, the former may be accurately positioned by the jig while the jig, in turn, is accurately maintained at the required angle by the V-shaped slot of the former.

The same principle is applicable to jigs of different shape and formers with apertures cut to fit and against which the tendency of the jig to expand laterally will frictionally bind the parts.

The remaining formers are now mounted on the jig in like manner and at proper spacing, which may be indicated either on the jig itself or by the accompanying instructions. If the jig is so made as to tend to resume its flat form, it will, regardless of the shape of the jig in cross section, frictionally bind itself to the several formers to assist in holding them in their selected position.

It is conventional to notch a former 3, 4, etc., to receive longitudinal members such as the longérons indicated at 25 in Fig. 10 or the spars 29, 31, in Fig. 14. The mere notching of the former does not leave a great deal of surface to which the longéron or spar may be glued. The present invention contemplates that in notching each former, there will preferably be left small tabs 26 of the former stock attached to the former so that these may be bent laterally when the longéron or spar is inserted, to provide increased gluing surface for additional security of connection.

Instead of providing a wooden strip to serve as a leading edge for the wing, one may use a folded piece of plastic or cardboard at 32 connected at its rear margins to the top and bottom spar elements 31, 29, and having its intermediate portion longitudinally channeled to constitute a leading edge, the finishing cover or skin 33 being applied over the former 32 at the leading edge of the wing and thence across the remaining spar elements in the usual manner.

After the skeleton of the model plane has been assembled as indicated in Figs. 1, 10, 13, 14 and 15, the cover or skin 33 will be applied over the fuselage and wings. At any desired stage of the proceedings, the jig 19 may be withdrawn or it may be left permanently within the plane. After the wings and fuselage are covered, the joint between them may be faired by specially designed webs 34, 35, adhesively secured to the fuselage and wings along lines remote from the angle therebetween, to span such angle, as clearly shown in Fig. 15.

The V shape of the jig as shown has inherent strength, stability and simplicity making it greatly preferable to other forms of jigs which may also be used within the scope of the appended claims.

What is claimed is:

1. For use in the assembly of a model airplane employing formers, a V-shaped jig comprising an elongated strip of sheet material longitudinally folded.

2. The combination with a jig comprising sheet stock having laterally expansible sides inherently biased for expansion, of a former having a portion complementarily engaged with the jig, the former portions and the jig portions complementarily engaged being interlocked against relative movement in the direction of the expansion of the sides of the jig, whereby the jig positions the former and the former determines the outline of the jig.

3. An airplane construction set comprising a jig strip creased for longitudinal folding and formers having parts formed to be assembled on the folded jig and respectively provided with portions shaped for interlocking engagement with external side portions of the jig for restricting such side portions from increasing their divergence.

4. An airplane construction set comprising a jig strip creased for longitudinal folding, and formers having parts formed to be assembled on the folded jig and respectively provided with portions shaped for interlocking engagement with external side portions of the jig for restricting such side portions from increasing their divergence, the jig requiring to be folded for interlocking engagement with the respective formers and the formers engaging the jigs interlockingly to position the formers while restricting the side portions of the jig against outfolding movement.

5. In a model airplane, a former having a V-shaped jig-receiving slot.

6. The device of claim 5 in which the former is provided with apertures with which the apex and ends of the slot communicate.

7. The device of claim 5 in which a V-shaped jig comprising a longitudinally folded strip is fitted to the slot.

8. A model airplane kit comprising a jig in the form of a longitudinally folded strip having free margins, of a set of formers having apertures fitted to said jig and threaded thereon.

9. In a model airplane kit, the combination with a plurality of former members adapted to be positioned by a jig in predetermined relative relation to one another, of a jig having a portion extending between said members and biased for change of lateral dimension, and having marginal portions externally engaged by the members and the members having portions engaging the jig, whereby to restrain the jig from change of lateral dimension.

10. A method of model airplane construction involving the use of planiform formers with openings of predetermined shape and marginal outlines corresponding to the cross section of an airplane element at various points, said method comprising the folding of a jig strip lengthwise, and assembling the formers on the folded jig strip.

11. The structure of claim 9 in which the several formers have marginal notches, tongues projecting laterally from said formers at the bases of the respective notches, and structural elements in the notches adhesively connected with the said tongues.

WILLIAM H. MATHÉE, Jr.
W. TURNOR LEWIS.